March 19, 1963  E. H. HECKETT  3,081,954
METHOD AND APPARATUS FOR RECOVERING REUSABLE METALLICS
FROM STEEL MAKING SLAG AND REFUSE
Filed June 27, 1960  5 Sheets-Sheet 1

INVENTOR
ERIC H. HECKETT

BY Francis J. Klempay
ATTORNEY

March 19, 1963 E. H. HECKETT 3,081,954
METHOD AND APPARATUS FOR RECOVERING REUSABLE METALLICS
FROM STEEL MAKING SLAG AND REFUSE
Filed June 27, 1960 5 Sheets-Sheet 2
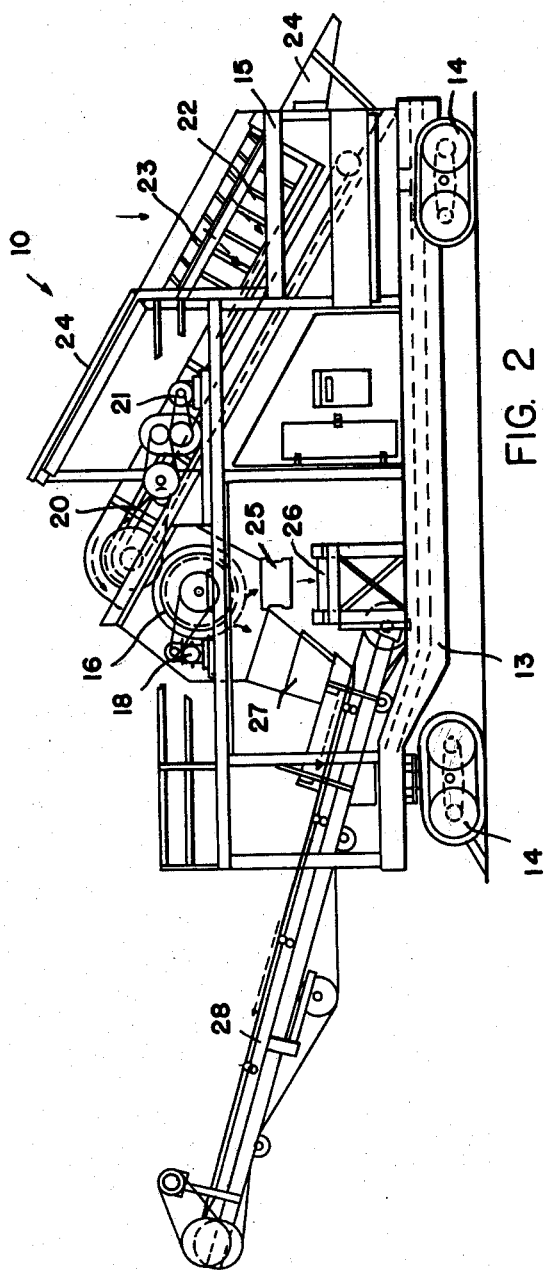
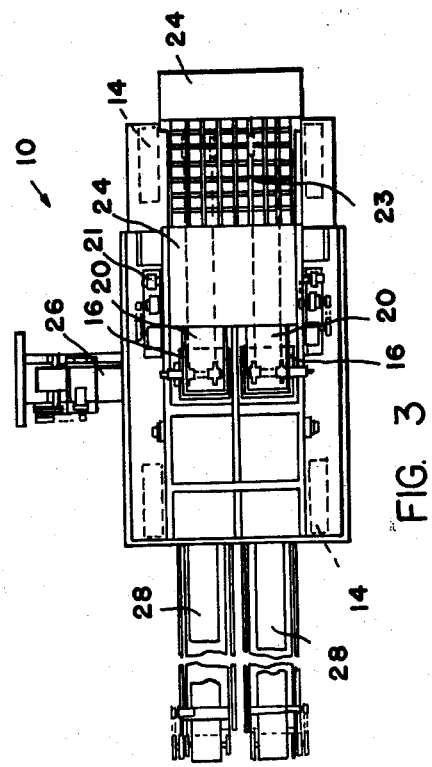
INVENTOR
ERIC H. HECKETT
BY Francis J. Klempay
ATTORNEY

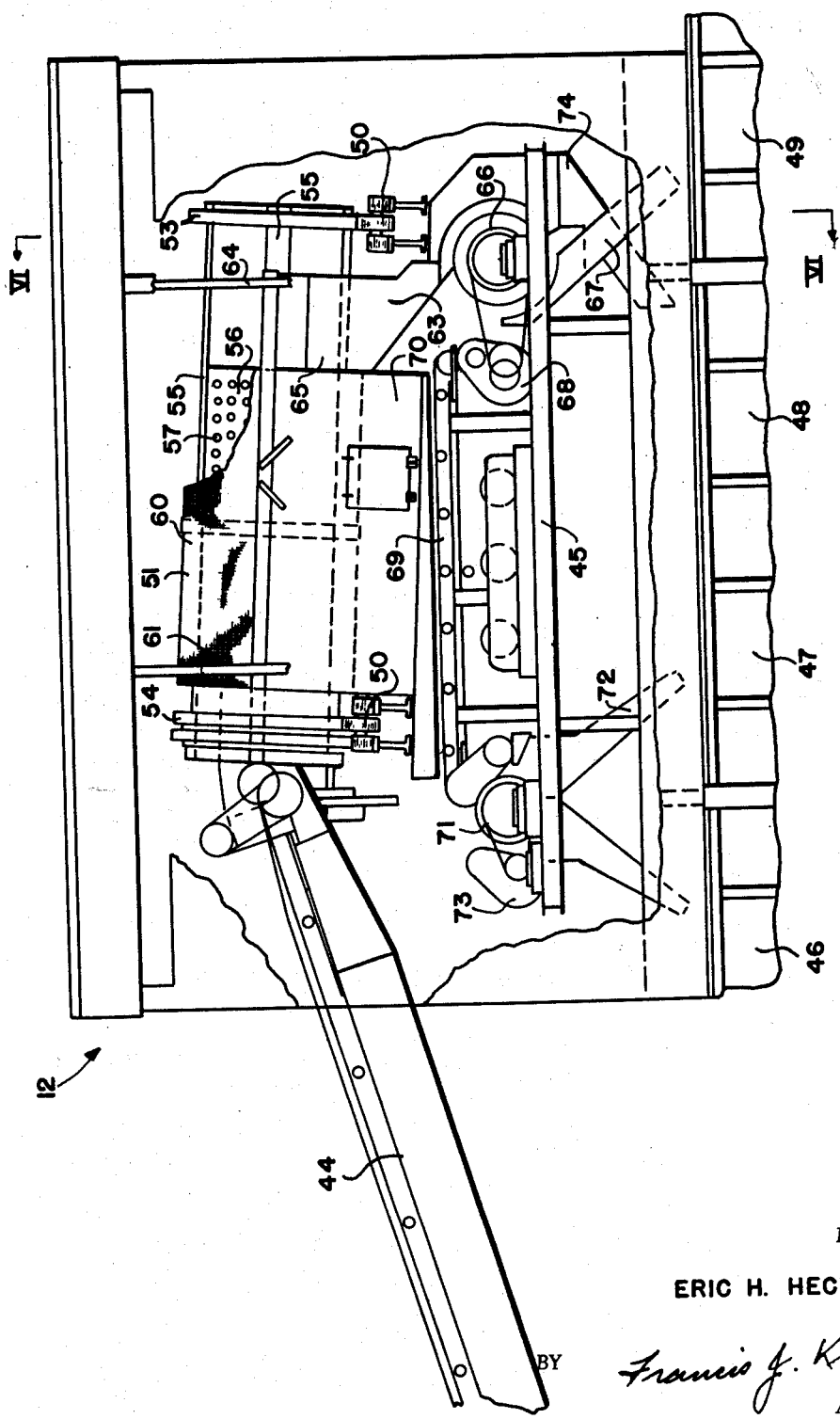

March 19, 1963  E. H. HECKETT  3,081,954
METHOD AND APPARATUS FOR RECOVERING REUSABLE METALLICS
FROM STEEL MAKING SLAG AND REFUSE
Filed June 27, 1960   5 Sheets-Sheet 5
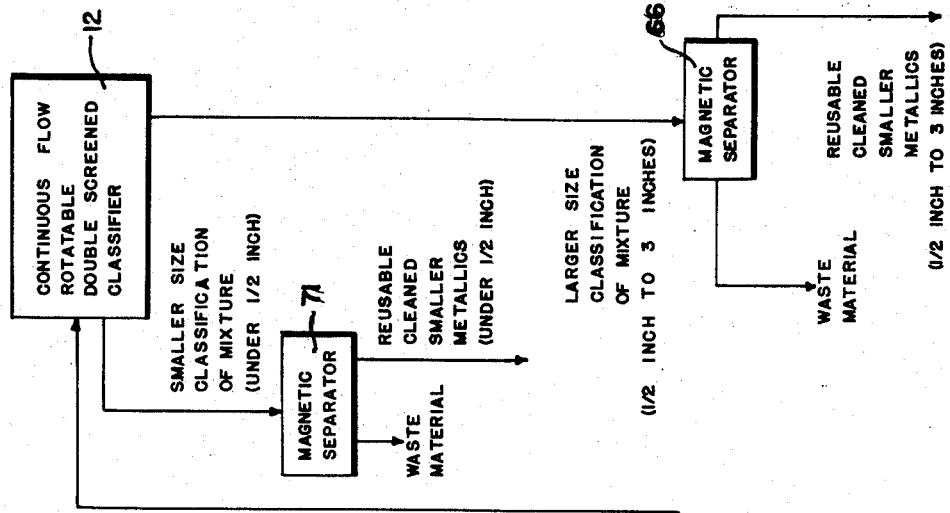
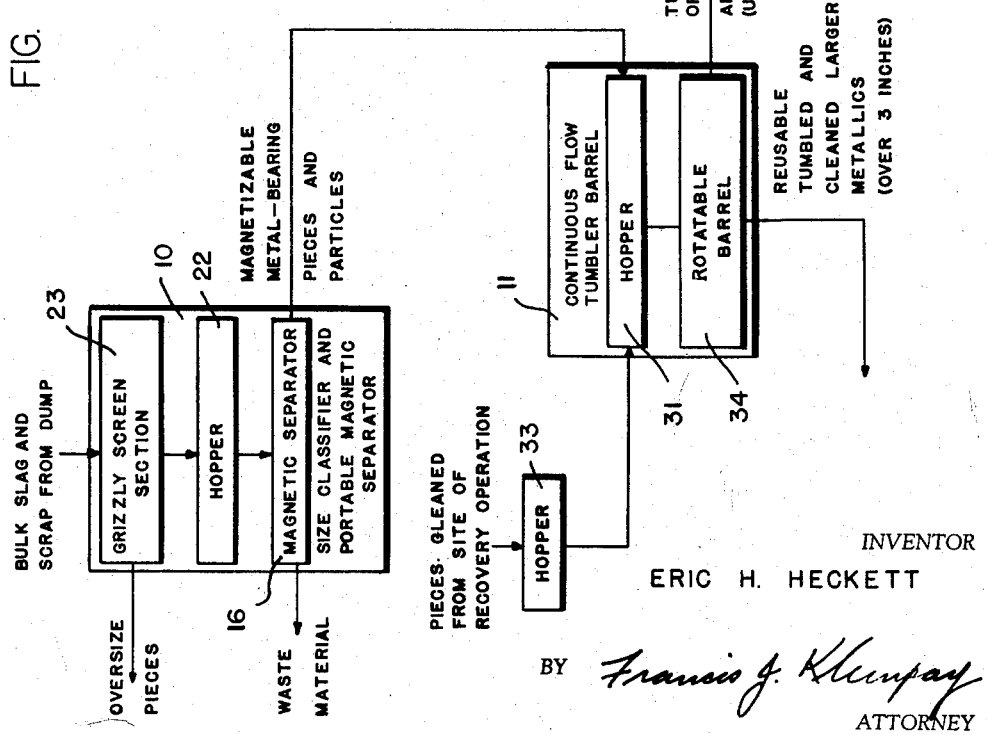
FIG. 7
INVENTOR
ERIC H. HECKETT
BY Francis J. Klempay
ATTORNEY

United States Patent Office 3,081,954
Patented Mar. 19, 1963

3,081,954
METHOD AND APPARATUS FOR RECOVERING REUSABLE METALLICS FROM STEEL MAKING SLAG AND REFUSE
Eric H. Heckett, Valencia, Pa., assignor to Harsco Corporation, Harrisburg, Pa., a corporation of Delaware
Filed June 27, 1960, Ser. No. 38,846
2 Claims. (Cl. 241—14)

The present application is a continuation-in-part application of my co-pending application Serial No. 590,071, filed June 7, 1956, now abandoned.

The present invention relates generally to the art of reclaiming metal bearing material from bulk waste materials and more particularly to the provision of improved method and apparatus for recovering reusable metallics from steel making slag and refuse. Steel making slag and refuse, as derived from the open hearth departments of steel mills, for example, usually comprise a high enough percentage of metal bearing material to warrant the processing thereof for the purpose of reclaiming and recovering those portions of the bulk material having an acceptable purity of metallic content. This has long been recognized in the art and various methods and apparatus for recovering the reusable metallics are in wide spread use throughout the steel-making industry.

It is the primary object of the present invention to provide method and apparatus for recovering reusable metallics from steel-making slag and refuse which are operative to process large and substantially increased tonnages of bulk slag and refuse in a continuous and integrated manner. Since the percentage of reusable metallics in the bulk slag and refuse is relatively low, large tonnages and amounts of the bulk material must be processed to obtain appreciable quantities of the reusable metallics. Also, it is generally recognized that the utility of such methods and apparatus is closely allied to and dependent upon the cost of handling, separating, classifying and collecting the bulk slag and refuse and the reusable metallics. The method and apparatus herein disclosed are ideally adapted for processing large tonnages of the bulk slag and refuse in a very efficient and automatic manner. As will be hereinafter more fully apparent, it is only necessary to feed the slag and refuse into the integrated apparatus and to collect the properly classified reusable metallics at spaced discharge points.

Another object of the invention is to provide method and apparatus for recovering reusable metallics from steel making slag and refuse wherein the amount of recovered and reusable metallics is substantially increased when compared with prior art apparatus and methods for a similar purpose. A perforate continuous flow tumbler barrel is employed to break and crush the encrusting materials and refuse and to clean the larger metallics which are discharged through the open downstream end of the tumbler barrel. Such larger and cleaned metallics may be used for charging open hearth furnaces, for example. The crushed encrusting or waste material and the smaller size metallics that drop through the apertures in the sides of the tumbler barrel are passed to a continuous flow rotatable double screened classifier. The continuous flow rotatable double-screened classifier is operative to simultaneously further tumble and separate into a plurality of distinct size classifications the encrusting or waste material and the smaller size metallics. The encrusting or waste materials adhere and cling much more tenaciously to the smaller metallics and the simultaneous separation and further tumbling thereof frees the smaller metallics from the encrusting materials. Only that portion of the metallics requiring further cleaning is subjected to the further tumbling and separating action provided by the continuous flow rotatable double screened classifier. The discharges of the double-screened classifier—comprising two distinct size classifications of smaller metallics and crushed encrusting or waste material in the disclosed embodiment of the invention—are passed over separate magnetic separator means to reclaim and separate the reusable smaller metallics from the waste material. This arrangement allows each of the magnetic separator means to be designed for a specific size of material whereby the separation of the smaller reusable metallics from the waste material is highly efficient.

A further object of the invention is to provide an improved continuous flow rotatable double-screened classifier which is operative to further tumble the smaller metallics and the waste material while separating the same into a plurality of distinct size classifications. The further tumbling of the smaller metallics along with the size separation thereof during such tumbling insures that the smaller metallics will be properly and completely cleaned and the use of separate magnetic separator means with each sized discharge of the double screened classifier provides maximum separation of the smaller metallics from the waste material.

Still another object of the invention is to provide method and apparatus of the type above described which is rugged and durable whereby the same are adapted to withstand continuous and sustained operation. The apparatus is characterized by its extreme simplicity in construction and operation.

The above, as well as other objects and advantages of the invention, will become readily apparent upon consideration of the following specification and accompanying drawing wherein there is disclosed a preferred embodiment constructed and operated in accordance with the teachings of this invention.

In the drawing:

FIGURE 2 is a side view of the portable size classifier and magnetic separator used in FIGURE 1;

FIGURE 3 is a plan view of the portable size classifier and magnetic separator;

FIGURE 4 is a side view of the improved continuous flow rotatable double-screened classifier employed in FIGURE 1;

FIGURE 7 is a schematic flow chart depicting the flow of material through the apparatus shown in FIGURE 1.

Figure 1:
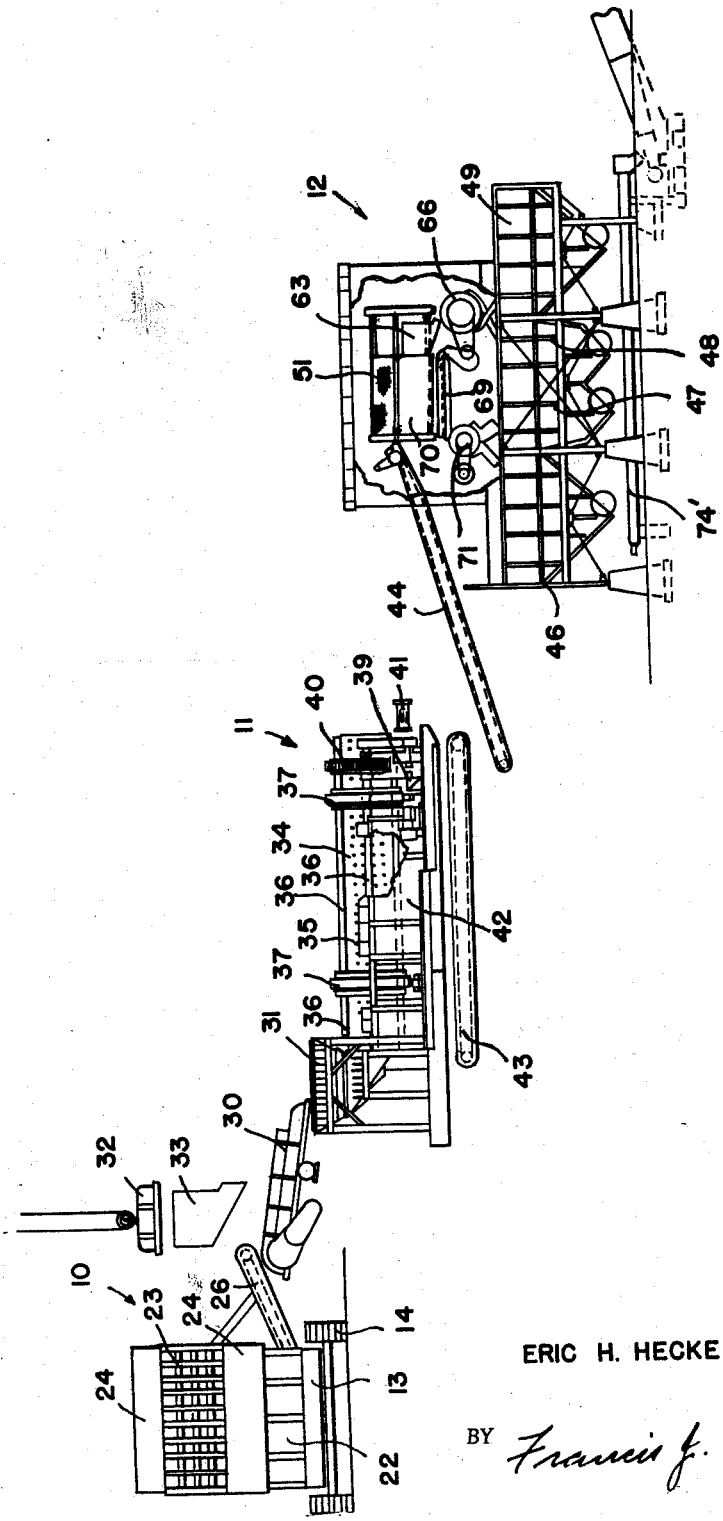
FIGURE 1 is a schematic side elevation of the apparatus employed in carrying out the method of the present invention.
Figure 5:
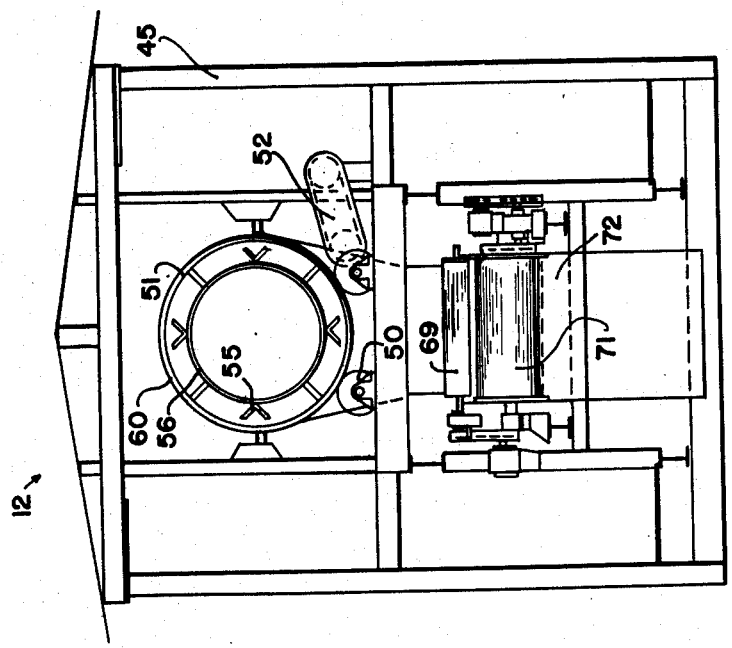
FIGURE 5 is an end view looking into the charging end of the continuous flow rotatable double-screened classifier depicted in FIGURE 4.
Figure 6:
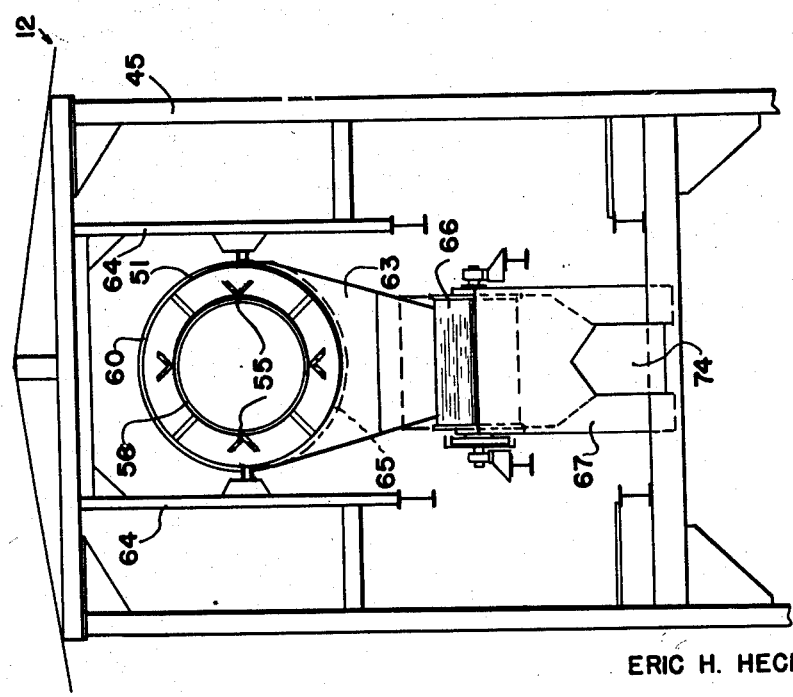
FIGURE 6 is an end view taken along the section line VI—VI of FIGURE 4.

Referring now to the drawing, and initially to FIGURE 1 thereof, there are shown three integrated pieces of equipment including a portable size classifier and magnetic separator 10, a perforate continuous flow tumbler barrel 11 and a continuous flow rotatable double-screened classifier 12. This equipment is disposed in operative relation at the sight of recovery operations, usually at the slag pits of a steel mill, and is adapted, as will be hereinafter more fully explained, to recover the reusable metallics from steel making slag and refuse in a highly improved and efficient manner.

The portable size classifier and magnetic separator 10 preferably comprises an elongated frame 13 which is supported on its ends by spaced pairs of crawlers 14. The frame 13 is offset vertically over the forward pair of crawlers 14 whereby the portable size classifier and magnetic separator sits quite close to the ground and due to the compact arrangement of the various apparatus carried on the frame 13, has a low center of gravity and a low silhouette.

Rigidly secured to the frame 13 is a structural framework 15 which supports, among other equipage, a pair of transversely aligned magnetic separating drums 16 which are adapted to be individually driven by the variable speed motors 18. The magnetic drums 16 are of well known construction and are provided with means for varying the magnetic attraction thereto to effect the desired degree of separation of the material flowing thereover.

The slag and refuse is supplied to the magnetic separating drums 16 by means of the inclined conveyors 20 which are independently driven by the variable speed motors 21 acting through suitable gearing. Positioned over the lower and rear ends of the conveyors 20 and the rear pair of crawlers 14 is a large hopper 22. The top of the hopper 22 is covered by an inclined grizzly 23 that is constructed from a plurality of bars arranged in a grid-like pattern. Front and rear aprons 24 prevent damage to the drive motors, etc. and direct or guide the slag and refuse dumped thereon.

In normal operations the bulk slag and refuse is dumped by the equipment servicing portable size classifier and magnetic separator, such as cranes with drag lines having clam buckets or portable magnets, not shown, on the inclined grizzly 23 or aprons 24. The grizzly rejects any pieces of material which are larger than the openings between the bars thereof and these oversize pieces are caused to roll onto the ground due to the inclined nature of the grizzly and the aprons. In this manner only slag and refuse of a predetermined maximum size falls into the hopper 22 and is accepted by the portable size classifier and magnetic separator. The sized slag and refuse in the hopper 23 is carried by the conveyors 20 to a position directly above the magnetic drums 16.

The sized slag and refuse is dropped over the magnetic drums 16 and that portion having the desired magnetic properties and as a result a predetermined minimum metallic content will cling to the drums and drop into the chutes 25 which in turn direct the same to a longitudinally extending conveyor 26. The waste material which does not have an acceptable metallic content will drop from the magnetic drums 16 prior to the other portion of the slag and refuse and is directed by chutes 27 to the forwardly projecting discharge conveyors 28.

It will thus be seen that the portion of the slag and refuse having desired magnetic properties and a predetermined minimum metallic content and being of a predetermined maximum size is deposited on the conveyor 26 while the waste material is discharged on the conveyors 28. The size classifier and magnetic separator 10 is especially well adapted for use in the disclosed recovery operations since it processes large tonnages of bulk slag and refuse in an economical and expedient manner, is rugged in construction, is compact to allow ease of servicing by appurtenant equipment, etc.

The magnetizable pieces and particles of slag and refuse having a predetermined maximum size are discharged by the conveyor 26 onto a vibrating apron feeder 30 which in turn feeds these pieces and particles to a hopper 31 at the charging end of the perforate continuous flow tumbler barrel 11. The apron feeder 30 is of well known construction and is adapted to feed the material to the hopper 31 in a vibrating manner to orientate and regulate the feed of the material so that jamming or clogging of the tumbler barrel is prevented. The flow of magnetizable pieces and particles of a predetermined maximum size from the portable size classifier and magnetic separator may be augmented by pieces which are gleaned from the sight of recovery operation by a portable magnet 32, for example. The pieces gleaned by the portable magnet 32 are dropped into a hopper 33 which discharges them onto the vibratory apron feeder 30.

The perforate continuous flow tumbler barrel 11 consists primarily of an elongated and open ended barrel 34 having apertures 35 of a predetermined size in the side walls thereof. The barrel 34 is rigidly reinforced by longitudinally extending beams 36 and encircling rings 37. The barrel is supported by suitable rollers, not particularly shown, and is adapted to be rotated by a motor 39 acting through suitable gearing 40. The internal surface of the barrel 34 is lined with a plurality of wear resistant plates, not shown, spaced in a manner to define a continuous screw-like working surface for conveying the material through the barrel. The perforate continuous flow tumbler barrel is preferably constructed in accordance with the teachings of by U.S. Patent No. 2,837,289 entitled "Tumbler Barrel for Impact Cleaning of Metal Scrap."

The perforate continuous flow tumbler barrel subjects the magnetizable pieces and particles of a predetermined maximum size delivered from the size classifier and portable separator 10 and any additional pieces gleaned from the sight of recovery operations by the portable magnet 32 to a violent and continuous churning and impacting whereby the masonry and other hard encrusting materials are broken from at least the larger metallics. The tumbling and agitation will clean the large metallics and at least partially clean the smaller metallics while the freed encrusting material will be crushed to a smaller size. The material is forced through the tumbler barrel at a predetermined rate and the larger size and cleaned metallics are carried out of the open downstream end of the barrel 34 onto a conveyor 41. These larger metallics are of such a size (depending primarily on the size of the openings in the grizzly 23 of the portable size classifier and magnetic separator and the size of the apertures 35 in the barrel 34) and have been cleaned to such an extent that they have a very high degree of metallic content. These larger metallics are especially well suited for use in charging the open hearth furnaces of a steel making plant. The conveyor 41 may transport the cleaned larger metallics to a suitable storage area or directly into a cart, truck or railroad car, whichever is most desirable and expedient in a given installation.

As previously mentioned, the encrusting material broken from the larger metallics is reduced by the constant impacting and agitation in the tumbler barrel and this waste material, along with the smaller metallics which, in most cases, are still at least partially encrusted with waste material drop through the apertures 35 in the tumbler barrel. A pair of guide plates 42 are positioned along the sides of the barrel 34 and define a V-shaped chute which effectively channels all of the material falling through the apertures in the barrel to a conveyor 43. The conveyor 43 is operative to transport the tumbled mixture of smaller metallics and encrusting material to the continuous-flow rotatable double-screened classifier 12.

As will be understood, a considerable amount of smaller reusable metallics drop through the apertures 35 in the barrel 34 along with the crushed and reduced waste material. The smaller metallic particles are at least partially freed from the encrusting materials due to the tumbling and agitation experienced in the continuous-flow rotatable tumbler barrel and they represent a high enough percentage of the total bulk of the tumbled mixture of smaller pieces and particles to warrant further reclamation operations. However, any further recovery operations must be very efficient and must process large tonnages of the tumbled mixture if the same are to be economically feasible. The smaller metallics, usually called "fines," may be employed in charging iron making furnaces, such as blast furnaces, after the same have been separated from the waste material.

The smaller metallics and the crushed encrusting material fall through the apertures 35 in the barrel 34 and are collected by the conveyor 43 which delivers the same to an upwardly inclined conveyor 44 leading to the charging end of the continuous-flow rotatable double-screened classifier 12. The classifier 12 is supported by a suitable framework 45 a considerable distance above the ground and directly over a plurality of storage bins 46–49. The framework 45 carries a plurality of spaced rollers 50 which rotatably support an elongated and inclined double-screened barrel 51. The barrel 51 is rotated about its axis by a variable speed motor 52 acting through suitable drive connections, not particularly shown.

The double-screened barrel 51 comprises a pair of longitudinally spaced end assemblies 53 and 54 which are interconnected and spanned by a plurality of longitudinally extending and circumferentially spaced angle-shaped supporting members 55. Attached to the inner edges of the supporting members 55 is an elongated and generally cylindrical inner screen 56 having openings 57 therein. The inner screen 56 may comprise a casting of light weight and wear resistant material, such as manganese, for example. Encircling the inner screen 56 in spaced relation thereto is an elongated and generally cylindrical outer screen 60 having openings 61 therein. It will thus be seen that the inner and outer screens are concentrically mounted and are adapted to be rotated upon energization of the motor 52 to tumble and agitate the material therein. The axis of the double screened barrel 51 is inclined slightly with respect to the horizontal whereby the material (comprising the smaller metallics and the crushed encrusting material) is fed through the double-screened barrel. For reasons to be hereinafter more fully explained, the openings 57 in the inner screen 56 are smaller than the apertures 35 in the sides of the continuous flow tumbler barrel but are larger than the openings 61 in the outer screen.

Positioned at the downstream end of the concentric and generally cylindrical inner and outer screens is a downwardly directed chute 63 which is stationarily supported by vertical members 64 from the framework 45. The chute 63 has an inturned semicircular lip portion 65 which is received in overlying relation with respect to the interior end surface of the outer screen 60. The arrangement is such that the smaller metallics and crushed encrusting material remaining within the interior of the inner screen 56 and entrapped between the inner and outer screens will be discharged into the chute 63.

Positioned directly beneath the lower end of the chute 63 is a magnetic separating drum 66 and a pair of chutes 67 and 74 are supported in proper relation beneath the magnetic drum 66. In this manner the smaller metallics and crushed encrusting material suspended between the inner and outer screens and retained within the interior of the inner screen will be collected and directed by the chute 63 over the magnetic separating drum 66 to separate the reusable smaller metallics from the waste material. The waste material will be directed by the chute 74 to the storage bin 48 while the reusable smaller metallics which cling to the periphery of the magnetic separating drum will be directed by chute 67 into the storage bin 49. The magnetic separating drum 66 is, of course, adapted to be rotated and the motor 68 is provided for this purpose.

The smaller metallics and crushed encrusting material passing through the openings in both the inner and outer screens are directed onto a horizontal conveyor 69 positioned directly below the double screened barrel 51 by means of angularly related and longitudinally extending guide plates 70. The conveyor 69 is operative to move this material toward the charging end of the double screened barrel. Positioned beneath the charging end of the double screened barrel and the end of the conveyor 69 is a magnetic separating drum 71 which, in combination with a V-shaped divider 72, is adapted to separate the smaller reusable metallics from the waste material. The magnetic separating drum 71 is driven by motor 73 and the smaller reusable metallics are directed to storage bin 46 while the waste material falls into the storage bin 47.

Each of the storage bins 46–49 is provided with a discharge gate, not particularly shown, at the bottom thereof and a conveyor 74' extends beneath the discharge chutes of these bins. The bins can be emptied individually or in multiples to deliver the reusable smaller metallics to suitable storage areas or directly into mobile hauling equipment or to deliver the waste material to suitable dumps or for further processing as is most desirable and expedient in a given installation.

Considering now the operation of the apparatus above described, bulk steel making slag and refuse is dropped on the grizzly 23 and aprons 24 of the portable size classifier and magnetic separator. The slag and refuse having a predetermined maximum size (depending on the size of the openings of the grizzly 23) are conveyed to the magnetic separating drums 16. The waste material is discharged on the conveyors 20 while that portion of the sized slag and refuse having the desired magnetic properties and, as a result, a predetermined minimum metallic content is directed onto the conveyor 26. The slag and refuse having a predetermined minimum metallic content and being of a predetermined maximum size is fed into the charging end of the continuous-flow tumbler barrel 11.

Normally, of course, pieces of slag and refuse gleaned from the sight of recovery operations by the magnet 32 will also be fed into the charging end of the continuous-flow tumbler barrel. These pieces, whether comparatively clean or deeply encrusted with waste material, will be fairly large and of highly irregular shape and the addition of these pieces to the mix inside the tumbler barrel is highly beneficial in grinding away and breaking up the encrusting material adhering to the reusable metallics. The mix within the tumbler barrel is subjected to a violent tumbling and impacting action whereby the encrusting material is broken from at least the larger metallics and the encrusting material is crushed to a much smaller size.

The larger metallics, which have been cleaned by the violent tumbling and impacting experienced in the tumbler barrel, are forced completely through the tumbler barrel and discharged on the conveyor 41. The smaller reusable metallics and the crushed encrusting material which pass through the apertures 35 in the sides of the barrel 34 are directed by the guide plates 42 to the conveyor 43 and thence, via conveyor 44, to the charging end of the continuous flow rotatable double-screened classifier. The classifier separates the smaller metallics and the crushed encrusting material into a plurality of distinct size classifications and while accomplishing this separation subjects the smaller metallics to further tumbling and churning. This combined separating and tumbling action results in the better cleaning of the smaller metallics since the encrusting materials adhere quite tenaciously thereto. It is noted that only that portion of the initial bulk slag and refuse which may be still partially encrusted—the smaller metallics—are subjected to this further cleaning and tumbling action.

The rotatable classifier separates the smaller metallics and crushed encrusting material into a plurality of distinct size classifications—that portion passing through the openings in both the inner and outer screens, that portion passing through the openings in the inner screen but entrapped between the inner and outer screens and that portion which is retained within the interior of the inner screen. The portion of the smaller metallics and crushed encrusting material which passes through the openings in both of the screens is collected and conveyed to the magnetic separating drum 71 where the reusable smaller metallics are separated from the waste material. The remainder of the smaller metallics and the crushed encrusting material—including those portions entrapped between the inner and outer screens and within the interior of the inner screen—is carried through and out the end of the double screened barrel into the chute 63 and are directed over the periphery of the magnetic separating drum 66. The reusable smaller metallics or fines are directed to storage bin 49 while the waste material is collected in storage bin 48.

The two size classifications of the smaller metallics and crushed encrusting material emitted from the classifier via chute 63 and conveyor 69 are passed over individual and separate magnetic separating drums to obtain maximum separation of the reusable cleaned smaller metallics from the waste material. Each of the magnetic separating drums and the divider or chutes associated therewith can be designed and operated to afford maximum separation of the smaller metallics from the waste material for the size of the particles being worked. For example, it will be understood that the relative weight of any particle varies directly with its size and that the magnitude of magnetic retraction required to hold the magnetic particles to the periphery of a magnetic separating drum and the optimum position of the divider or chutes with respect to the magnetic separating drum will vary for different sizes of particles being processed. Thus, each of the magnetic separating drums and its associated divider or chutes are designed and operated to reclaim the maximum amount of reusable smaller metallics from the material being processed.

By way of an example, but in no way intended to limit the present invention, the apertures 35 in the tumbler barrel 34 may be three inches in diameter whereby the larger reusable metallics forced out the discharge end of the tumbler barrel will have a particle size of over three inches. The smaller metallics and crushed encrusting material delivered to the continuous-flow rotatable classifier 12 will have a particle size of less than three inches. The openings in the inner screen 56 may be one and one-half inches in diameter so that the smaller metallics and encrusting material having a particle size from one and a half inches to three inches will be retained within the inner screen 56. The still smaller metallics and crushed encrusting material will pass onto the outer screen 60 which preferably has a one-half inch square mesh. Smaller metallics and encrusting material having a particle size of less than one-half inch will pass through the openings in both of the screens and onto the conveyor 69 while the smaller metallics and encrusting material having a particle size from one-half of an inch to one and one-half inches will be entrapped between the inner and outer screens. Thus, the cleaned reusable metallic in the storage bins 46 will have a particle size of less than one-half of an inch while the smaller metallics in storage bin 49 will range in size from one-half of an inch to three inches.

It should now be apparent that I have accomplished the objects initially set forth by providing highly improved method and apparatus for recovering reusable metallics from steel making slag and refuse. Of particular importance is that large tonnages of bulk slag and refuse are processed in a continuous and automatic manner with a minimum of effort and in a minimum of time. The smaller metallics and crushed encrusting material are separated into a plurality of distinct size classifications while simultaneously being subjected to further tumbling and churning to further clean the smaller metallics. The sized discharges emitted by the rotatable classifier are each passed over individual magnetic separating drums. The above provide for the maximum recovery and reclamation of the reusable smaller metallics from the waste material.

It should also be readily apparent that many changes may be made in the disclosed embodiment of the invention without departing from the clear teachings thereof. For example, it may be desirable to provide another magnetic separating drum and direct the material retained in the interior of the inner screen over this additional magnetic separating drum by the use of suitable conveying means rather than combining this material with the material entrapped between the inner and outer screens.

Accordingly, reference should be had to the following appended claims in determining the true scope and intent of this invention.

I claim:
1. The method of processing large volumes of intermingled steel-making slag and refuse to recover reusable metallics therefrom separated as to size which consists of subjecting said slag and refuse to an initial coarse size separation, magnetically separating the resultant smaller size component to provide a charge having a perceptible metal content, subjecting said charge to violent tumbling and impacting to break away and crush the encrusting material from at least the larger of the metallic pieces contained in said charge, separating the thus tumbled and impacted charge according to particle size whereby the said larger metallic pieces are removed from the smaller particles comprised of crushed slag and smaller metal pieces, thereafter further tumbling and impacting the smaller particle component of said charge to further remove encrusting material from said smaller metal pieces while separating said last mentioned component into a plurality of size classifications, and thereafter magnetically separating each of said classifications into two factions to provide two granulous components of different particle size rich in metallic content.

2. The method of processing large volumes of intermingled steel-making slag and refuse to recover reusable metallics therefrom separated as to size which consists of subjecting said slag and refuse to an initial coarse size separation, magnetically separating the resultant smaller size component to provide a charge having a preceptable metal content, subjecting said charge to violent tumbling and impacting to break away and crush the encrusting material from at least the larger of the metallic pieces contained in said charge, separating the thus tumbled and impacted charge according to particle size whereby the said larger metallic pieces are removed from the smaller particles comprised of crushed slag and smaller metal pieces, thereafter further tumbling and impacting the smaller particle component of said charge to further remove encrusting material from said smaller metal pieces, thereafter separating said last mentioned component into a plurality of size classifications, and thereafter magnetically separating the said classification of larger particle size to provide a granulous component which is rich in metallic content.

References Cited in the file of this patent
UNITED STATES PATENTS

| | | |
|---|---|---|
| 1,284,872 | Bryan | Nov. 12, 1918 |
| 1,554,976 | Kearns | Sept. 22, 1925 |
| 2,269,912 | Ladoo et al. | Jan. 13, 1942 |
| 2,603,423 | Buehl | July 15, 1952 |
| 2,721,035 | Lankford et al. | Oct. 18, 1955 |
| 2,726,815 | Heckett | Dec. 13, 1955 |
| 2,728,454 | Heckett | Dec. 27, 1955 |